US011999045B2

(12) United States Patent
Aoki

(10) Patent No.: US 11,999,045 B2
(45) Date of Patent: Jun. 4, 2024

(54) WORK TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 362 days.

(21) Appl. No.: 17/601,961

(22) PCT Filed: Apr. 13, 2020

(86) PCT No.: PCT/JP2020/016350
§ 371 (c)(1),
(2) Date: Oct. 7, 2021

(87) PCT Pub. No.: WO2020/218073
PCT Pub. Date: Oct. 29, 2020

(65) Prior Publication Data

US 2022/0184793 A1 Jun. 16, 2022

(30) Foreign Application Priority Data

Apr. 22, 2019 (JP) ................................ 2019-081354

(51) Int. Cl.
*B25F 5/00* (2006.01)
*B25F 5/02* (2006.01)
(Continued)

(52) U.S. Cl.
CPC ................ *B25F 5/008* (2013.01); *B25F 5/02* (2013.01); *B26D 1/06* (2013.01)

(58) Field of Classification Search
CPC .. H02K 9/00; H02K 9/02; H02K 9/06; H02K 7/00; H02K 7/08; B25F 5/006; B25F 5/008; B25F 5/02
See application file for complete search history.

(56) References Cited

U.S. PATENT DOCUMENTS

2017/0239802 A1 8/2017 Aoki
2017/0239803 A1* 8/2017 Aoki ...................... B25F 5/008
(Continued)

FOREIGN PATENT DOCUMENTS

CN 107097183 A 8/2017
CN 107148327 A 9/2017
(Continued)

OTHER PUBLICATIONS

Sep. 28, 2021 International Preliminary Report on Patentability issued in International Patent Application No. PCT/JP2020/016350.
(Continued)

*Primary Examiner* — Tran N Nguyen
(74) *Attorney, Agent, or Firm* — Oliff PLC

(57) ABSTRACT

A work tool includes a housing, a spindle, a motor a transmitting mechanism, and a heat dissipation part. The transmitting mechanism is configured to transmit rotation of a first shaft of the motor to the spindle to cause the spindle to rotary oscillate. The transmitting mechanism includes a metal second shaft coupled to the first shaft and having an eccentric part, a drive bearing including an inner ring fixed around the eccentric part, an outer ring, a plastic retainer arranged between the inner ring and the outer ring, and rolling elements rollably retained by the retainer, and an oscillating member having a first end portion fixed to the spindle and a second end portion abutting on an outer periphery of the outer ring. The heat dissipation part is made of metal, arranged in contact with the second shaft and configured to rotate integrally with the second shaft.

13 Claims, 14 Drawing Sheets

(51) Int. Cl.
*H02K 9/06* (2006.01)
*B26D 1/06* (2006.01)

(56) References Cited

U.S. PATENT DOCUMENTS

| | | | |
|---|---|---|---|
| 2017/0312902 | A1 | 11/2017 | Noguchi et al. |
| 2018/0283508 | A1 | 10/2018 | Aoki |
| 2019/0077004 | A1 | 3/2019 | Numata |

FOREIGN PATENT DOCUMENTS

| | | | | |
|---|---|---|---|---|
| CN | 109482961 | A | | 3/2019 |
| JP | 9093866 | A | * | 4/1997 |
| JP | 2011-005574 | A | | 1/2011 |
| JP | 2017-132006 | A | | 8/2017 |
| JP | 2017-144537 | A | | 8/2017 |
| JP | 2017-144539 | A | | 8/2017 |
| JP | 2017-177309 | A | | 10/2017 |
| JP | 2018-167391 | A | | 11/2018 |
| JP | 2019-051563 | A | | 4/2019 |

OTHER PUBLICATIONS

Oct. 4, 2022 Office Action issued in Japanese Patent Application No. 2019-081354.
Jun. 16, 2020 International Search Report issued in International Patent Application No. PCT/JP2020/016350.
Apr. 12, 2023 Office Action issued in Chinese Patent Application No. 202080030114.4.

* cited by examiner

WORK TOOL

TECHNICAL FIELD

The present invention relates to a work tool that is configured to drive a tool accessory in an oscillating manner to perform a processing operation on a workpiece.

BACKGROUND

Known work tools (so-called oscillating tools) are configured to drive a tool accessory coupled to a lower end of a spindle in an oscillating manner to perform a processing operation on a workpiece. These oscillating tools include a transmitting mechanism that transmits rotation of an output shaft of a motor to the spindle and causes the spindle to rotary oscillate within a specified angle range. For example, Japanese laid-open patent publication No. 2018-167391 discloses a transmitting mechanism that includes an eccentric shaft, a drive bearing and an oscillating arm. The eccentric shaft is coupled to the output shaft of the motor and has an eccentric part. The drive bearing is mounted around an outer periphery of the eccentric part. The oscillating arm has one end portion that is fixed around an outer periphery of the spindle and the other end portion that is bifurcated and is disposed to abut on an outer periphery of the drive bearing.

SUMMARY

Technical Problem

In the transmitting mechanism having the above-described structure, the drive bearing is driven at high rotation speed and under high load, thereby causes large heat generation. Therefore, in order to improve durability of the drive bearing, a countermeasure against the heat generation is desired.

Accordingly, in consideration of these circumstances, it is an object of the present invention to provide an effective countermeasure against heat generation in a work tool that drives a tool accessory in an oscillating manner to perform a processing operation on a workpiece.

Solution to Problem

According to one aspect of the present invention, a work tool is provided that is configured to drive a tool accessory in an oscillating manner to perform a processing operation on a workpiece. The work tool includes a housing, a spindle, a motor, and a transmitting mechanism. The spindle is supported by the housing to be rotatable around a first rotational axis. The motor is housed in the housing. The motor includes a stator, a rotor, and a first shaft. The first shaft extends from the rotor and is configured to rotate integrally with the rotor around a second rotational axis. The transmitting mechanism is configured to transmit rotation of the first shaft of the motor to the spindle and to cause the spindle to rotary oscillate within a specified angle range around the first rotational axis. The transmitting mechanism includes a second shaft, a drive bearing and an oscillating member. The second shaft is coaxially coupled to the first shaft and has an eccentric part that is eccentric to the second rotational axis. The second shaft is made of metal. The drive bearing includes an inner ring, an outer ring, a retainer and a plurality of rolling elements. The inner ring is fixed around an outer periphery of the eccentric part. The retainer is made of plastic and arranged between the inner ring and the outer ring. The plurality of rolling elements are rollably retained by the retainer. The oscillating member has a first end portion and a second end portion. The first end portion is fixed to the spindle. The second end portion is arranged to abut on an outer periphery of the outer ring of the drive bearing. The work tool further includes a heat dissipation part arranged to be in contact with the second shaft and configured to rotate integrally with the second shaft. The heat dissipation part is made of metal.

When the motor is driven, the transmitting mechanism of the present aspect causes the spindle to rotary oscillate via the drive bearing that is fixed around the outer periphery of the eccentric part of the second shaft and the oscillating member that has the second end portion that abuts on the outer periphery of the drive bearing. In such a transmitting mechanism, a large load is applied to the drive bearing. Accordingly, the drive bearing generates heat, and thus the temperature of the drive bearing may become high. To cope with this, in the present aspect, the heat dissipation part made of metal is in contact with the second shaft made of metal, which has relatively high thermal conductivity. Therefore, the heat generated in the drive bearing is transferred to the heat dissipation part via the second shaft, owing to thermal conduction. In addition, the rotation of the heat dissipation part causes a flow of surrounding air, and therefore heat exchange between the heat dissipation part and the air is promoted, and thus the heat generated in the drive bearing can be effectively dissipated. Consequently, the retainer made of plastic (polymer), which is relatively weak to heat but has superior resistance to vibration, can be favorably adopted in the drive bearing.

In one aspect of the present invention, the heat dissipation part may protrude radially outward from the second shaft. Further, the heat dissipation part may have an intersecting surface that intersects a rotation direction of the heat dissipation part. According to the present aspect, the heat dissipation part has a shape that can easily slice (cut) through and stir air while rotating, so that the heat can be further effectively dissipated.

In one aspect of the present invention, the heat dissipation part may be a fan that is configured to be rotated by power of the motor to generate an airflow that flows into the housing through an inlet of the housing. In other words, the heat dissipation part may also serve as a fan. According to the present aspect, components within the housing can be appropriately cooled by the airflow generated by the fan and the heat exchange between the fan serving as the heat dissipation part and the air can be further promoted.

In one aspect of the present invention, the work tool may further comprise a fan configured to be rotated integrally with the second shaft by power of the motor to generate an airflow that flows into the housing through an inlet of the housing. Further, the heat dissipation part may be formed as a member that is discrete from the fan.

In one aspect of the present invention, the heat dissipation part may be arranged between the fan and the drive bearing in an axial direction of the second rotational axis.

In one aspect of the present invention, the housing may have a first path and a second path. The first path directs an airflow for cooling the motor to the motor. The second path is different from the first path and directs an airflow for cooling the heat dissipation part to the heat dissipation part. According to the present aspect, the motor, which generates a large amount of heat, can be cooled by the airflow directed along the first path, while the heat dissipation part can be cooled independently of the motor by the airflow directed along the second path.

In one aspect of the present invention, the fan may be a single fan having a plurality of first blades configured to generate the airflow that flows along the first path, and a plurality of second blades configured to generate the airflow that flows along the second path. According to the present aspect, a structure can be realized that can effectively cool the motor and the heat dissipation part without increasing parts count.

In one aspect of the present invention, the number of the second blades may be larger than the number of the first blades. According to the present aspect, a surface area of the heat dissipation part can be increased and thus the heat dissipation performance can be enhanced.

In one aspect of the present invention, the motor may be a brushless motor. Further, the second path may pass a radially outward region of a motor body, which includes the stator and the rotor. The rotor of the brushless motor is smaller than that of a brushed motor and thus the heat capacity of the brushless motor is smaller, compared to the brushed motor, and therefore, the temperature of the brushless motor is apt to become high. To cope with this, according to the present aspect, the rotor can be cooled by the airflow led along the first path and the second path passes the radially outward region of the motor body. Accordingly, it is possible to reduce an influence of the heat of the rotor on the airflow passing along the second path.

In one aspect of the present invention, the first rotational axis and the second rotational axis may extend in parallel to each other. In other words, the spindle and an output shaft of the motor may extend in parallel to each other. According to the present aspect, the spindle and the motor can be arranged closer to each other, compared to a structure in which the first rotational axis and the second rotational axis intersect each other. Therefore, the work tool can be downsized.

DESCRIPTION OF EMBODIMENTS

Embodiments are now described with reference to the drawings.

First Embodiment

An oscillating tool 101 according to a first embodiment is now described with reference to FIGS. 1 to 12. The oscillating tool 101 is an example of an electric work tool that is configured to drive a tool accessory 91 in an oscillating manner to perform a processing operation on a workpiece (not shown).

Figure 1:
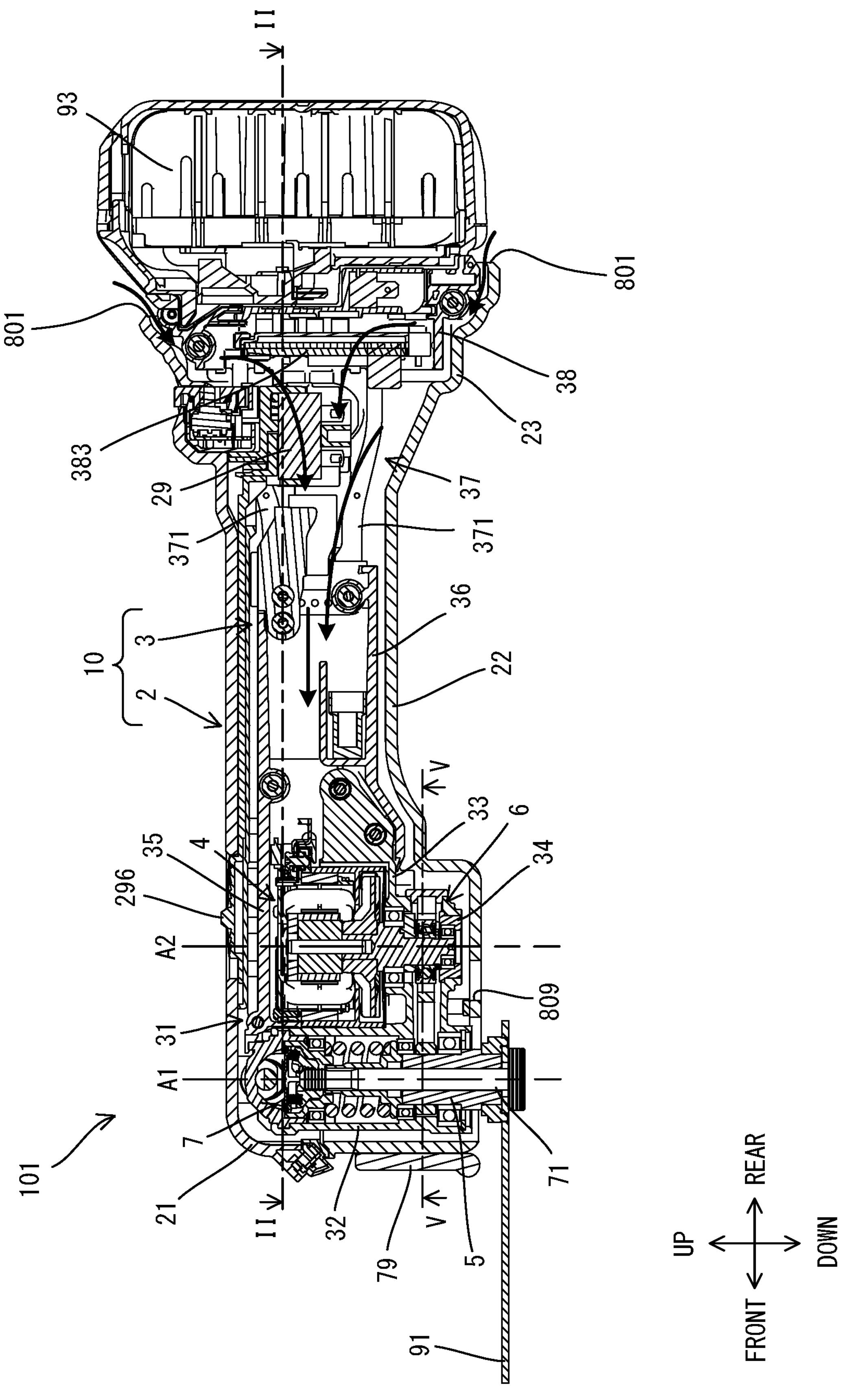
FIG. 1 is a sectional view of an oscillating tool with a tool accessory mounted thereto.

First, the general structure of the oscillating tool 101 is described. As shown in FIG. 1, the oscillating tool 101 includes an elongate housing (also referred to as a tool body) 10. An elongate spindle 5 and a motor 4, which serves as a driving source, are housed in one end portion of the housing 10 in its longitudinal direction. The spindle 5 is arranged such that a longitudinal axis of the spindle 5 intersects (more specifically, substantially orthogonally intersects) a longitudinal axis of the housing 10. One axial end portion of the spindle 5 protrudes from the housing 10 and is exposed outside of the housing 10. The tool accessory 91 can be removably mounted to this portion. Further, a battery 93 for supplying electric power to the motor 4 can be removably mounted on the other end portion of the housing 10 in the longitudinal direction. In the oscillating tool 101, the spindle 5 is driven about a rotational axis A1 with a rotary oscillating motion within a specified angle range, using power generated by the motor 4, and thereby oscillates the tool accessory 91.

For the sake of convenience in the following description, relating to the directions of the oscillating tool 101, an extension direction of the rotational axis A1 is defined as an up-down direction. In the up-down direction, the side of the spindle 5 on which the tool accessory 91 is mountable is defined as a lower side, while the opposite side is defined as an upper side. A direction that is orthogonal to the rotational axis A1 and that corresponds to the longitudinal direction of the housing 10 is defined as a front-rear direction. In the front-rear direction, the side of one end portion of the housing 10 in which the spindle 5 is housed is defined as a front side, while the side of the other end portion on which the battery 93 is mountable is defined as a rear side. Further, a direction that is orthogonal to both the up-down direction and the front-rear direction is defined as a left-right direction.

The detailed structure of the oscillating tool 101 is now described.

Figure 2:
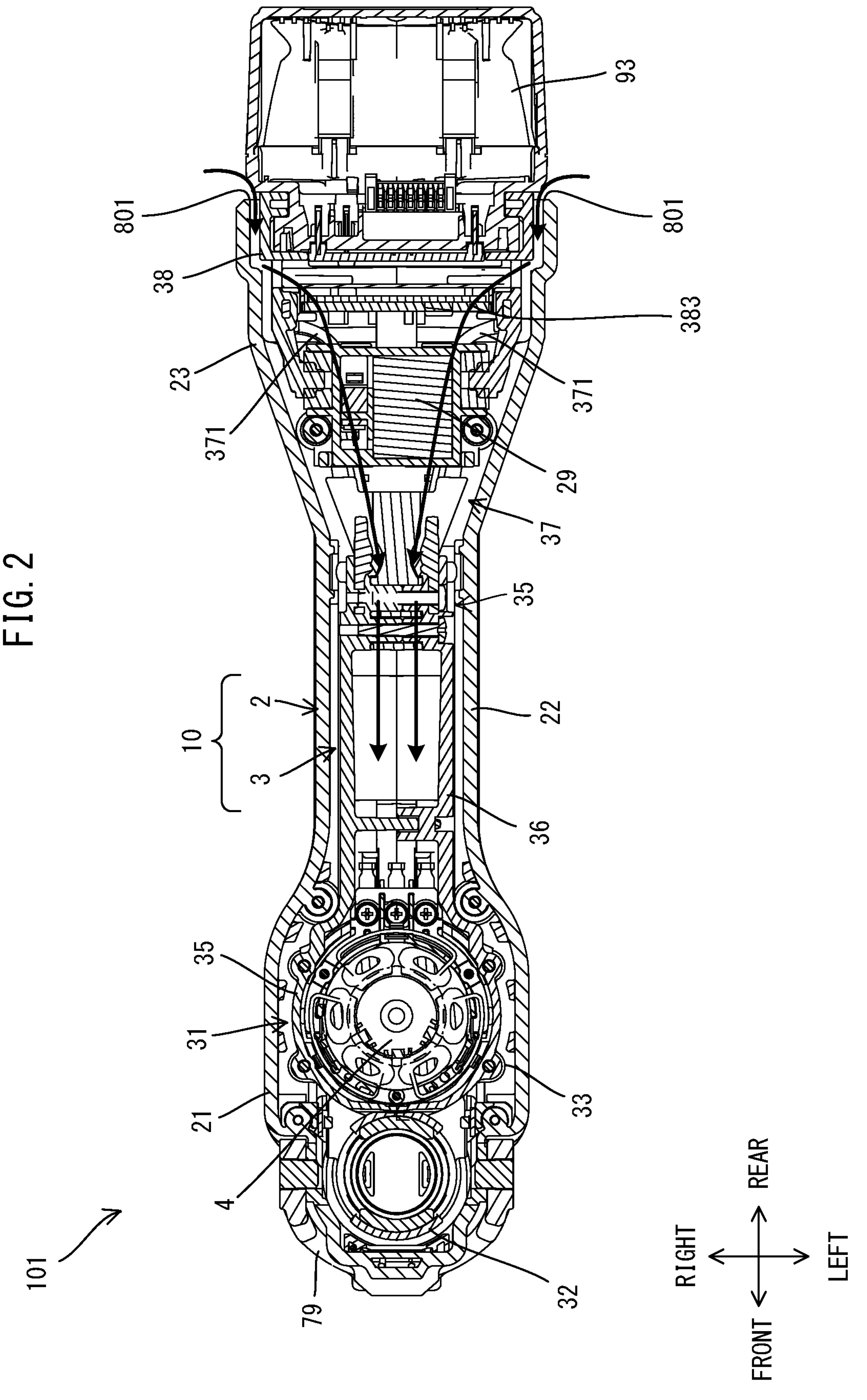
FIG. 2 is a sectional view taken along line II-II in FIG. 1.

First, the housing 10 is described. As shown in FIGS. 1 and 2, the housing 10 of this embodiment includes an elongate outer housing 2, which forms an outer shell of the oscillating tool 101, and an elongate inner housing 3, which is housed in the outer housing 2. Although not shown in detail, in this embodiment, the housing 10 is configured as a so-called vibration-isolating housing, and the outer housing 2 and the inner housing 3 are connected to be movable relative to each other, via a plurality of elastic members.

The outer housing 2 includes a front part 21, a rear part 23 and a central part 22 connecting the front part 21 and the rear part 23.

The front part 21 has a generally rectangular box-like shape. A front part 31 of the inner housing 3 is disposed in the front part 21. A lever 79 is pivotably supported by an upper front end portion of the housing 10 (the outer housing 2). The lever 79 is an operable member for securing the tool accessory 91 and for releasing the tool accessory 91 via a lock mechanism 7, which will be described below (see FIG. 4). A slide operation part 296 is disposed on an upper surface of the front part 21. The operation part 296 is an operable member for switching ON and OFF of a switch 29 for driving the motor 4. Through holes are formed through a bottom wall of the front part 21. These through holes serve as outlets 809 for discharging air from an inside to an outside of the housing 10.

The rear part 23 has a tubular shape having a sectional area increasing toward the rear. The switch 29 is held within the rear part 23. Further, an elastic connection part 37 and a rear part 38 of the inner housing 3 are disposed within the rear part 23.

The central part 22 has a tubular shape having a substantially uniform diameter, and linearly extends in the front-rear direction. The central part 22 forms a grip part configured to be held by a user. Therefore, the central part 22 is narrower than the front part 21 and the rear part 23 so as to be easily held by the user.

Figure 3:
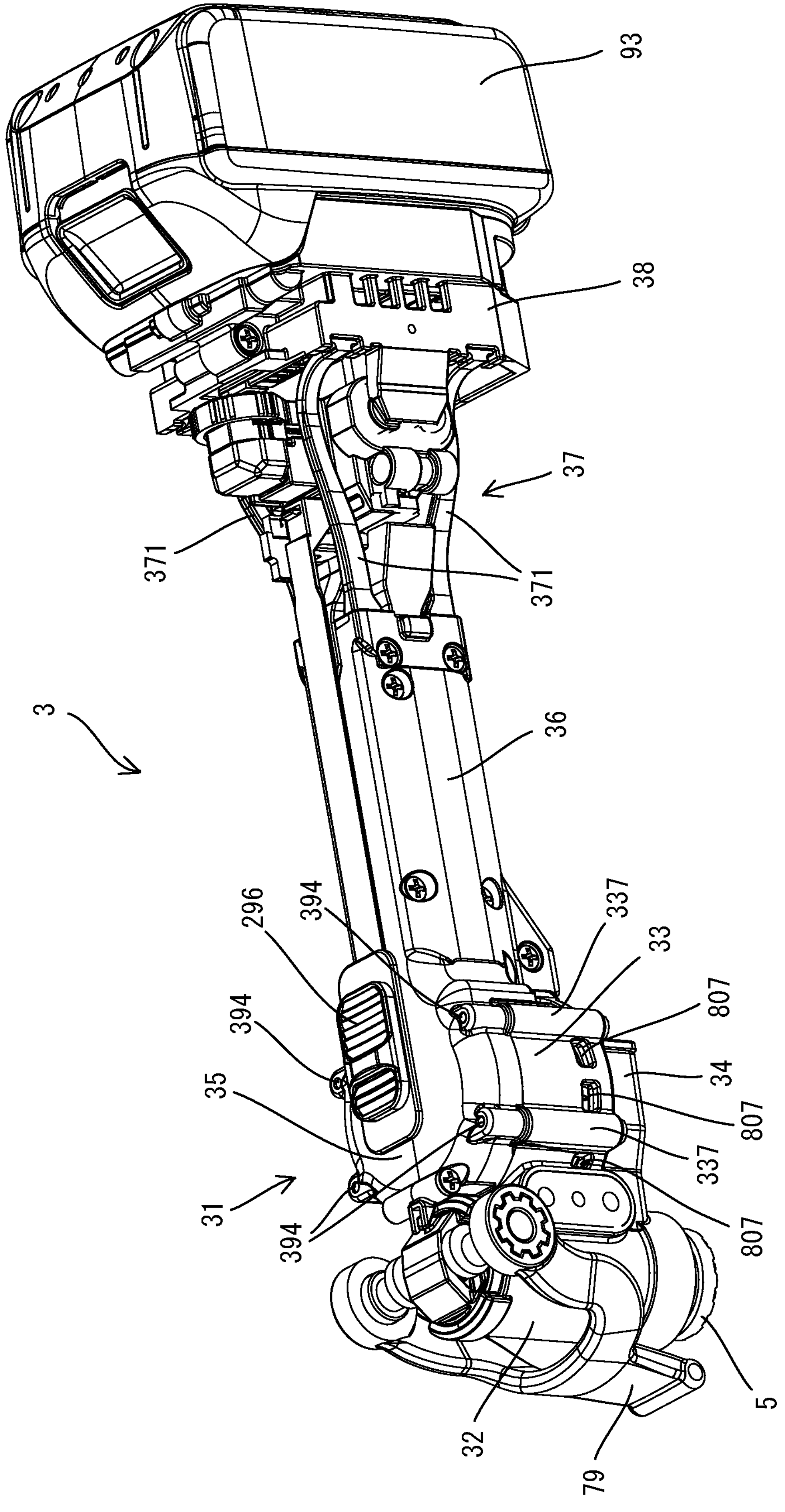
FIG. 3 is an overall perspective view of an inner housing.

As shown in FIGS. 1 to 3, the inner housing 3 includes the front part 31, an extending part 36, the elastic connection part 37 and the rear part 38.

The front part 31 is a portion that houses the spindle 5, the motor 4 and a transmitting mechanism 6. The front part 31 includes a first housing part 32, a second housing part 33, a third housing part 34 and a cover part 35. The first housing part 32 is a portion that has a circular hollow cylindrical shape and extends in the up-down direction. An upper portion of the first housing part 32 is partially covered with a cover. The second housing part 33 is a portion that has a circular hollow cylindrical shape having a larger diameter than the first housing part 32. The second housing part 33 is behind the first housing part 32. The third housing part 34 is a portion that has a circular hollow cylindrical shape having a smaller diameter than the second housing part 33. The third housing part 34 is behind the first housing part 32 and under the second housing part 33. The third housing part 34 communicates with the first housing part 32 and the second housing part 33. The first housing part 32, the second housing part 33 and the third housing part 34 are integrally formed of metal. The cover part 35 is a portion that covers an open top of the second housing part 33. The cover part 35 is integrally formed of plastic (polymer) with the extending part 36, the elastic connection part 37 and the rear part 38.

The extending part 36 is a tubular portion that is connected to a rear end portion of the front part 31 and extends rearward. The length of the extending part 36 in the front-rear direction is approximately equal to the length of the central part (grip part) 22 in the front-rear direction. The extending part 36 is thus generally entirely disposed within the central part 22.

The elastic connection part 37 extends rearward from a rear end of the extending part 36 and connects the extending part 36 and the rear part 38 such that the extending part 36 and the rear part 38 are movable relative to each other. The elastic connection part 37 includes multiple elastic ribs 371 that connect the extending part 36 and the rear part 38 in the front-rear direction. In this embodiment, four such elastic ribs 371 are arranged spaced apart from each other around a longitudinal axis of the inner housing 3 that extends in the front-rear direction. The elastic ribs 371 are shaped to be more easily deformable and are also made of a material having a lower elastic modulus than the other portions of the inner housing 3. The elastic ribs 371 can thus reduce transmission of vibration, which is generated in the front part 31 during operation, to the rear part 38. The switch 29 is arranged in a space surrounded by the elastic ribs 371.

The rear part 38 has a generally rectangular box-like shape. In this embodiment, a rear portion of the rear part 38 forms a battery-mount part, which includes an engagement structure for sliding engagement with a battery 93 and terminals that are electrically connectable to the battery 93. A front portion of the rear part 38 forms a control-unit housing part that houses a controller 383, which includes a control circuit. The controller 383 drives the motor 4 when the switch 29 is turned ON. As described above, the rear part 38 is disposed within the rear part 23 of the outer housing 2. A gap is formed between the rear part 23 and an outer peripheral surface of the rear part 38. In this embodiment, an annular opening defined by a rear end (an open end) of the rear part 23 and the outer peripheral surface of the rear part 38 serves as an inlet 801 for drawing outside air into the housing 10.

The structures disposed within the front part 31 of the inner housing 3 are now described in detail.

Figure 4:
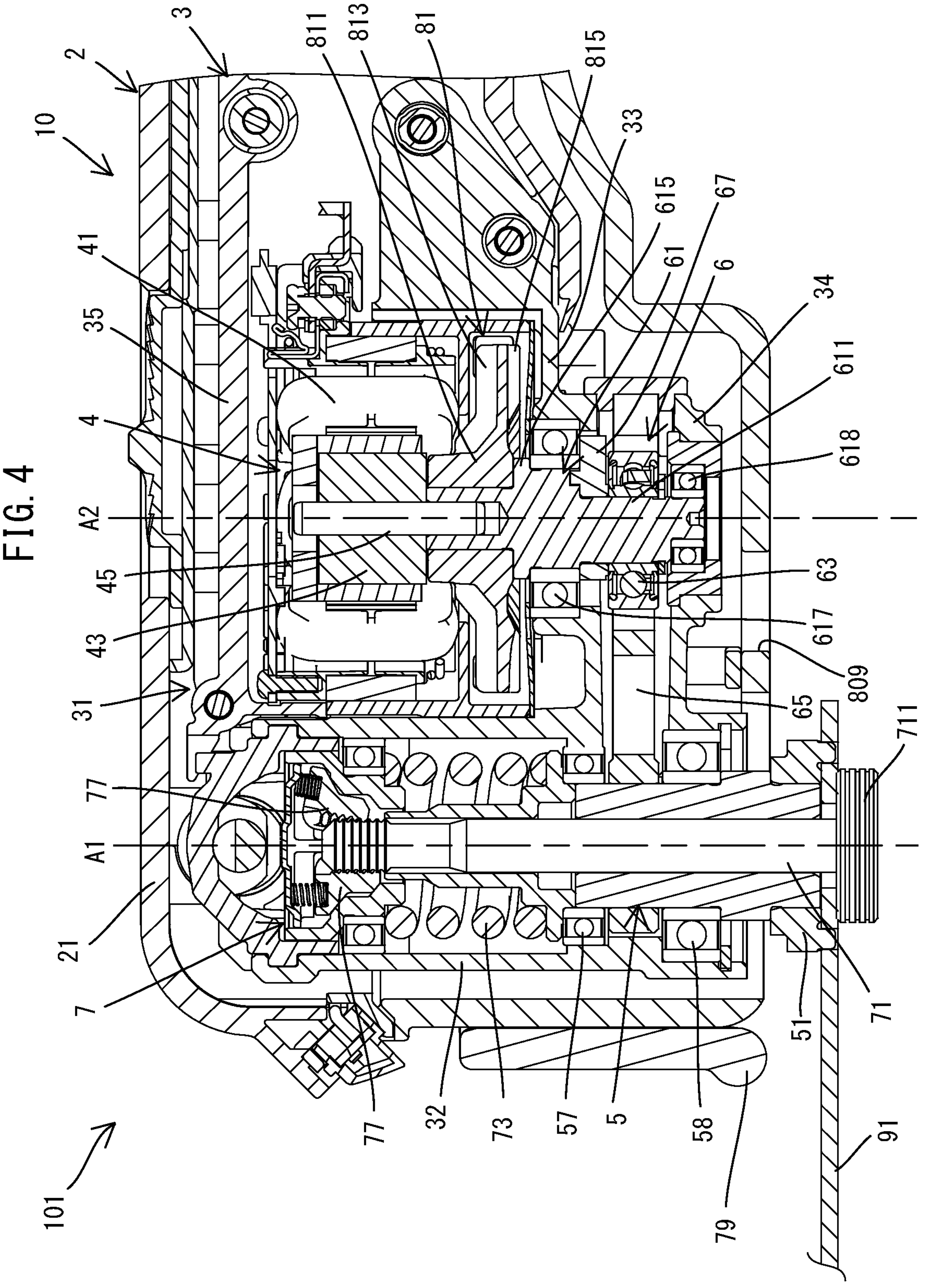
FIG. 4 is a partial, enlarged view of FIG. 1.

As shown in FIG. 4, the front part 31 houses the spindle 5, the lock mechanism 7, the motor 4 and the transmitting mechanism 6.

The spindle 5 is an elongate member having a generally circular hollow cylindrical shape. In this embodiment, the spindle 5 is supported by two bearings 57 and 58 to be rotatable around the rotational axis A1. The bearings 57 and 58 are held in a lower portion of the first housing part 32. The spindle 5 has a flange-like tool mounting part 51. The tool mounting part 51 is on a lower end portion of the spindle 5 that is exposed outside the housing 10, and protrudes radially outward. The tool mounting part 51 is a portion that is configured such that the tool accessory 91 can be removably mounted thereto. In this embodiment, the tool accessory 91 is clamped between the tool mounting part 51 and a clamping head 711 of a clamping shaft 71 and is thereby fixedly held relative to the spindle 5.

The clamping shaft 71 is configured to be insertable into the spindle 5. The clamping shaft 71 is an elongate member having a generally circular solid cylindrical shape. The clamping shaft 71 has the flange-like clamping head 711 on a lower end portion thereof. Further, annular grooves are formed around an upper end portion of the clamping shaft 71.

The lock mechanism 7 is configured to lock the clamping shaft 71 in a clamping position (a position shown in FIG. 4). In (at) the clamping position, the clamping shaft 71 and the spindle 5 are capable of clamping the tool accessory 91. The lock mechanism 7 is disposed above the spindle 5 within the first housing part 32. The lock mechanism 7 includes a biasing spring 73 and a pair of clamping members 77. The biasing spring 73 biases the clamping shaft 71 upward. The pair of clamping members 77 is engageable with the groove part formed in the upper end portion of the clamping shaft 71. The lock mechanism 7 is configured to operate in response to manual pivoting operation of the lever 79 being performed by the user.

The basic structures of the lock mechanism 7 and the lever 79 are well known and therefore briefly described here. When the lever 79 is in (at) a lock position (a position shown in FIG. 4), the clamping members 79 engage with the groove part of the clamping shaft 71 and thus clamp the clamping shaft 71. In this state, when the clamping shaft 71 is biased upward by the biasing spring 73 and thus locked in the clamping position, the tool accessory 91 is fixedly held relative to the spindle 5. On the other hand, when the lever 79 is pivoted upward from the lock position and placed in an unlock position, a biasing force of the biasing spring 73 to the clamping members 77 is released and thus the clamping members 77 are allowed to move radially outward. Thus, the clamping shaft 71 is unlocked and thus the user can pull the clamping shaft 71 out of the spindle 5.

In this embodiment, a small and high-power brushless DC motor is adopted as the motor 4. The motor 4 includes a stator 41, a rotor 43 disposed in the stator 41, and an output shaft 45 that extends from the rotor 43 and is configured to rotate integrally with the rotor 43. The motor 4 is housed in the second housing part 33 such that a rotational axis A2 of the output shaft 45 extends in parallel to the rotational axis A1 of the spindle 5 (i.e. in the up-down direction). The output shaft 45 protrudes downward from the rotor 43.

Figure 5:
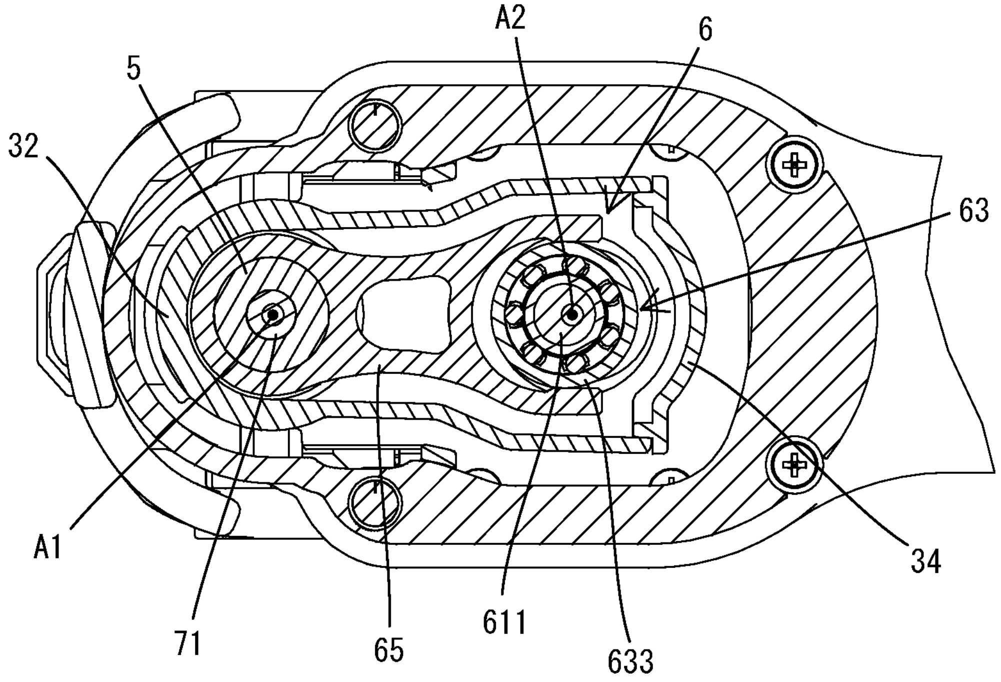
FIG. 5 is a sectional view taken along line V-V in FIG. 1.

The transmitting mechanism 6 is configured to transmit rotary motion of the output shaft 45 to the spindle 5 to rotary oscillate the spindle 5 within a specified angle range around the rotational axis A1. As shown in FIGS. 4 and 5, the transmitting mechanism 6 of this embodiment includes an eccentric shaft 61, a drive bearing 63, and an oscillating arm 65.

The eccentric shaft 61 is a metal (for example, iron) shaft and is coaxially connected to the output shaft 45 of the motor 4. The eccentric shaft 61 is fixed to an outer periphery of the output shaft 45. The eccentric shaft 61 extends from a lower end of the rotor 43 into a lower end portion of the third housing part 34. The eccentric shaft 61 is rotatably supported by bearings 617 and 618. The bearing 617 is held in a lower end portion of the second housing part 33. The bearing 618 is held in the lower end portion of the third housing part 34. A portion of the eccentric shaft 61 that extends upward of the bearing 617 has a flange part 615. The flange part 615 is in contact with an inner ring of the bearing 617 and thus supported by the bearing 617. The eccentric shaft 61 has an eccentric part 611 that is eccentric to the rotational axis A2. The eccentric part 611 is located between the bearings 617 and 618 in the up-down direction. When the motor 4 is driven, the eccentric shaft 61 rotates integrally with the output shaft 45.

Figure 6:
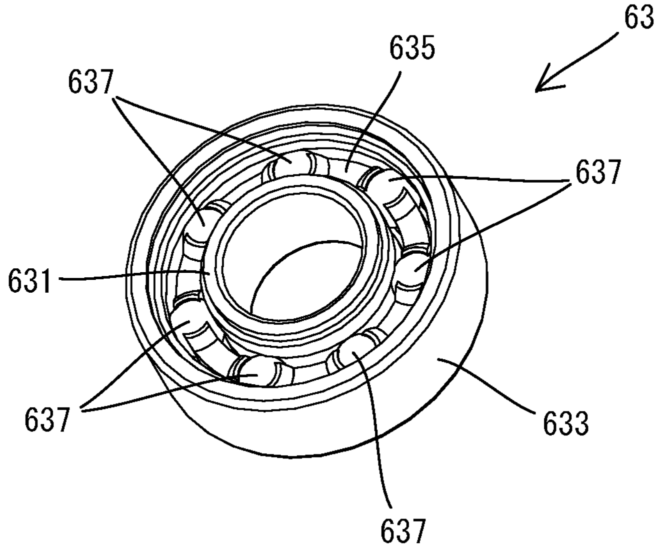
FIG. 6 is a perspective view of a drive bearing.

The drive bearing 63 is a ball bearing, and is mounted on the eccentric part 611. More specifically, as shown in FIG. 6, the drive bearing 63 includes an inner ring 631, an outer ring 633, a retainer 635 disposed between the inner ring 631 and the outer ring 633, and balls 637 rollably retained by the retainer 635. In this embodiment, the inner ring 631 and the outer ring 633 are made of metal, while the retainer 635 is made of plastic (polymer), which is resistant to vibration. As shown in FIGS. 4 and 5, the inner ring 631 is fixed around the outer periphery of the eccentric part 611. The drive bearing 63 is thus mounted on the eccentric part 611. A balancer 67, which balances the eccentric shaft 61 in rotating, is fixed around the eccentric part 611 above the drive bearing 63 (between the drive bearing 63 and the bearing 617).

The oscillating arm 65 is a member that connects the drive bearing 63 and the spindle 5. The oscillating arm 65 extends across the first housing part 32 and the third housing part 34. One end portion of the oscillating arm 65 is annular-shaped and fixed around an outer periphery of the spindle 5 between the bearings 57 and 58. The other end portion of the oscillating arm 65 is bifurcated (forked) and its two ends are disposed to abut from left and right on an outer peripheral surface of the outer ring 633 of the drive bearing 63. The outer peripheral surface of the outer ring 633 is a cylindrical surface.

When the motor 4 is driven, the eccentric shaft 61 rotates integrally with the output shaft 45. In response to the rotation of the eccentric shaft 61, a center of the eccentric part 611 moves around the rotational axis A2 and thus the drive bearing 63 also moves around the rotational axis A2, which causes the oscillating arm 65 to oscillate within the specified angle range about the rotational axis A1 of the spindle 5. Since the one end portion of the oscillating arm 65 is fixed around the spindle 5, the spindle 5 is driven with a rotary oscillating motion within the specified angle range around the rotational axis A1 in response to oscillating motion of the oscillating arm 65. As a result, the tool accessory 91 fixed to the spindle 5 oscillates about the rotational axis A1 in an oscillation plane, which enables a processing operation to be performed.

Further, as shown in FIG. 4, a fan 81 is fixed around the eccentric shaft 61. More specifically, the fan 43 is fixed around a portion of the eccentric shaft 61 between the rotor 43 and the drive bearing 63 in the up-down direction (further more specifically, a portion between the rotor 43 and the upper bearing 617 (or a portion above the flange part 615)). In this embodiment, the fan 81 is configured to generate an airflow for cooling the motor 4 and to serve as a heat dissipation part that dissipates heat transferred to the fan 81 via the eccentric shaft 61. Further, in order to enhance heat dissipation performance, the fan 81 is configured to also generate an airflow for cooling the fan 81, separately from the motor 4.

Figure 7:
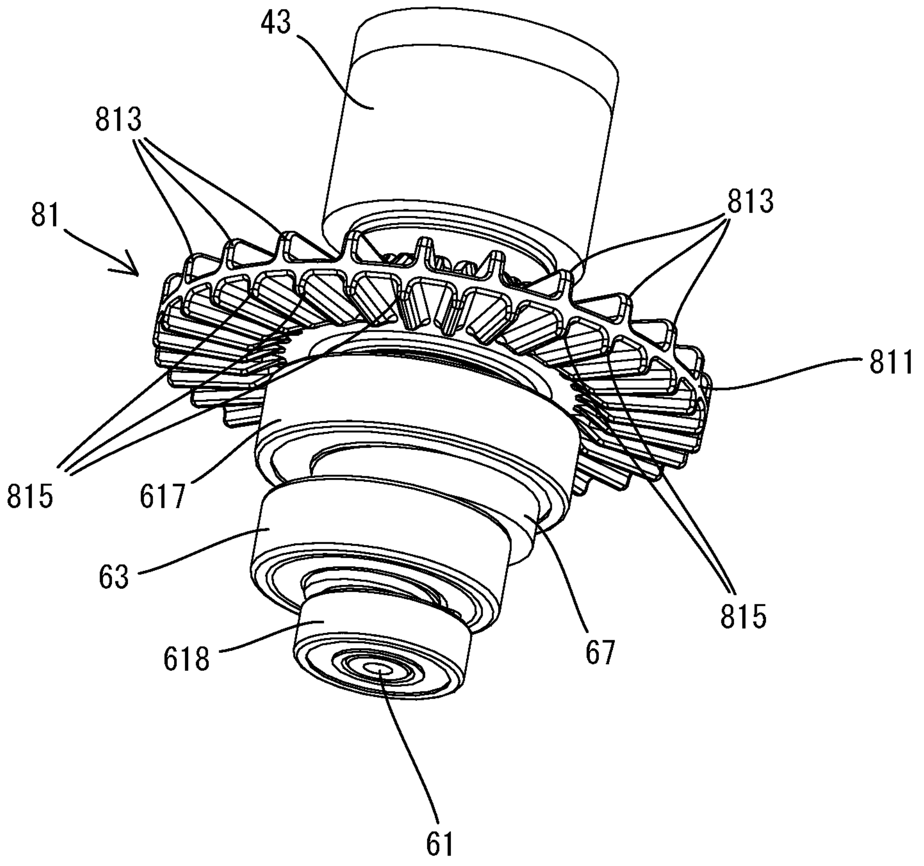
FIG. 7 is a perspective view of a fan and other components mounted on an eccentric shaft.

Specifically, the fan 81 is structured as a centrifugal fan that is capable of drawing air from two directions. As shown in FIGS. 4 and 7, the fan 81 includes a base 811, a plurality of first blades 813 and a plurality of second blades 815. The base 811, the first blades 813 and the second blades 815 are integrally formed of metal (for example, aluminum alloy).

The base 811 includes a hollow cylindrical hub fixed around an outer periphery of the eccentric shaft 61, and an annular plate part protruding radially outward from the hub. The first blades 813 respectively protrude upward (toward a side of the rotor 43) from an upper surface of the plate part of the base 811 and radially extend from the hub to an outer edge of the plate part. The second blades 815 respectively protrude downward (opposite to the first blades 813) from a lower surface of the plate part and radially extend from the hub to the outer edge of the plate part. The first blades 813 and the second blades 815 each have a surface that intersects a circumferential direction around the rotational axis A2 (i.e., a rotation direction of the fan 81). The fan 81 generates the airflow for cooling the motor 4 using the first blades 813 and also generates the airflow for cooling the fan 81, which serves as the heat dissipation part, using the second blades 815. In this embodiment, the number of the second blades 815 is larger than the number of the first blades 813. Further, an upward protruding height of the first blades 813 is larger than a downward protruding height of the second blades 815.

The detailed arrangement of the motor 4 and the fan 81 in the second housing part 33 and airflow paths within the housing 10 are now described.

Figure 8:
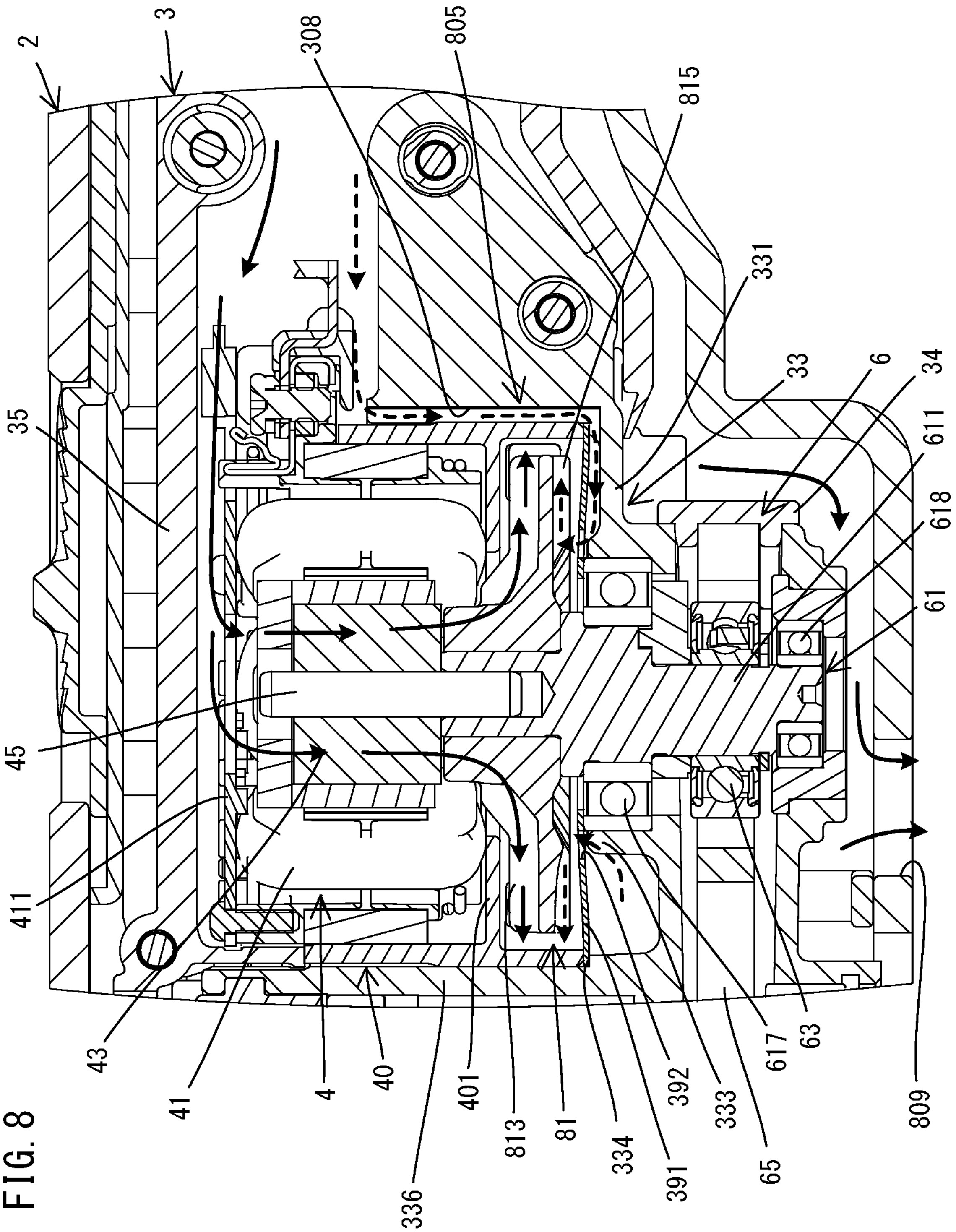
FIG. 8 is another partial, enlarged view of FIG. 1.
Figure 9:
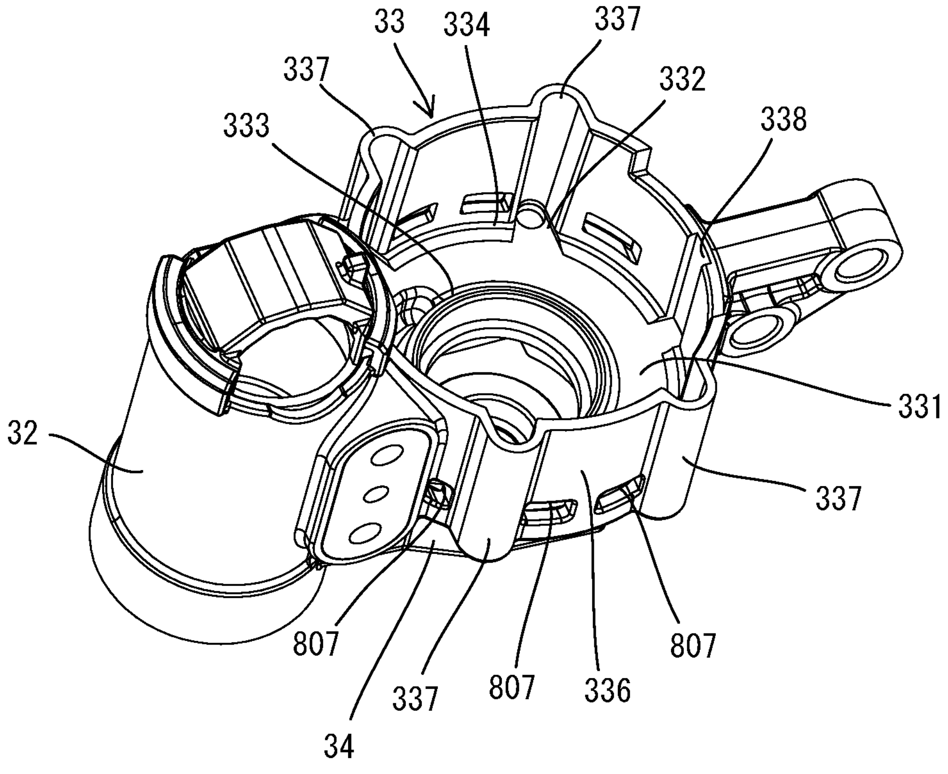
FIG. 9 is a perspective view of first to third housing parts.

As shown in FIGS. 8 and 9, the second housing part 33 includes an annular bottom wall 331 and a peripheral wall 336 that protrudes upward from an peripheral edge of the bottom wall 331 and forms a generally hollow circular cylindrical shape.

The bottom wall 331 has protrusions 332 that are disposed at four positions in the circumferential direction and protrude radially outward. The protrusion 332 has a semicircular shape as viewed from above and has a through hole. Further, a hollow circular cylindrical portion 333, which is configured as a holding part for the bearing 617, is formed in a central portion of the bottom wall 331. A stepped portion 334, which protrudes upward from an upper surface of the bottom wall 311, is formed in a peripheral edge portion of the bottom wall 331, along the peripheral wall 336. The stepped portion 334 is not formed in portions that correspond to the protrusions 332 and in a portion that corresponds to a groove 338, which will be described below. Thus, the stepped portion 334 has an annular shape separated by five portions. A protruding height of the stepped portion 334 is approximately equal to that of the cylindrical portion 333.

The peripheral wall 336 has protrusions 337, corresponding to the protrusions 332, at four positions in the circumferential direction. The protrusions 337 each protrude radially outward and has a semicircular sectional shape. The protrusions 337 extend in the up-down direction from a lower end to an upper end of the peripheral wall 336. The groove 338, which linearly extends in the up-down direction from the lower end to the upper end of the peripheral wall 336, is formed on an inner peripheral surface of a rear end portion of the peripheral wall 336. Further, the peripheral wall 336 has through holes formed in multiple positions in the circumferential direction. These through holes serve as outlets 807 for discharging air from an inside to an outside of the second housing part 33.

Figure 10:
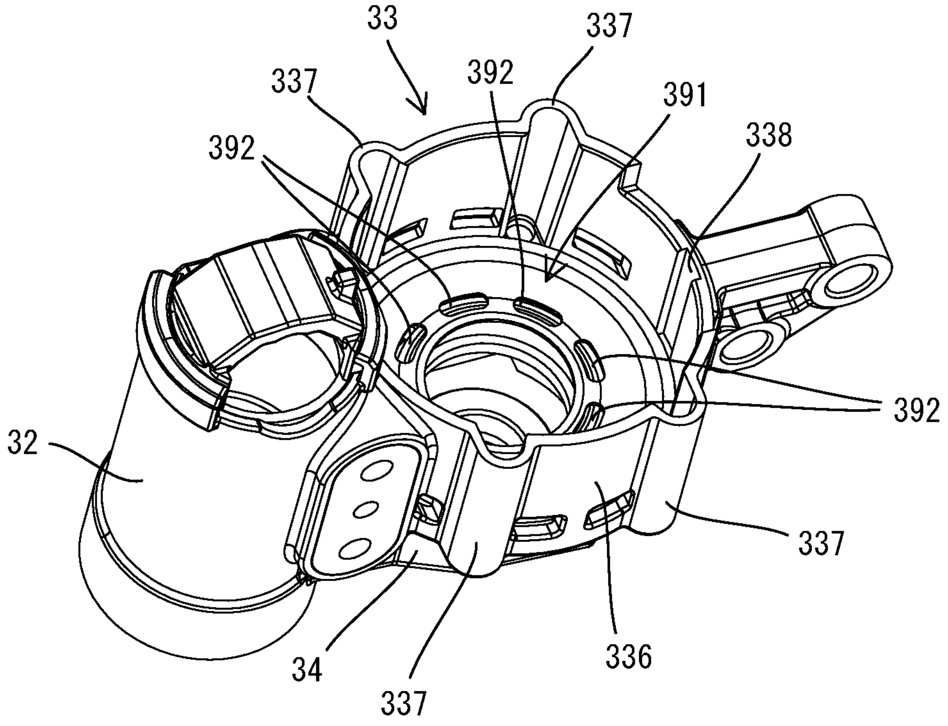
FIG. 10 is a perspective view of the first to third housing parts wherein a partition plate is disposed in the second housing part.

As shown in FIGS. 8 and 10, an annular partition plate 391 is disposed in the second housing part 33. The partition plate 391 is supported by the stepped portion 334 of the bottom wall 331 and an outer ring of the bearing 617 that is held in the cylindrical portion 333. Thus, an internal space of the second housing part 33 is partitioned into a space formed between the partition plate 391 and a lower surface of the cover part 35, and a space formed between the partition plate 391 and the upper surface of the bottom wall 331. Multiple through holes 392 are formed around an inner peripheral edge of the partition plate 391.

Figure 11:
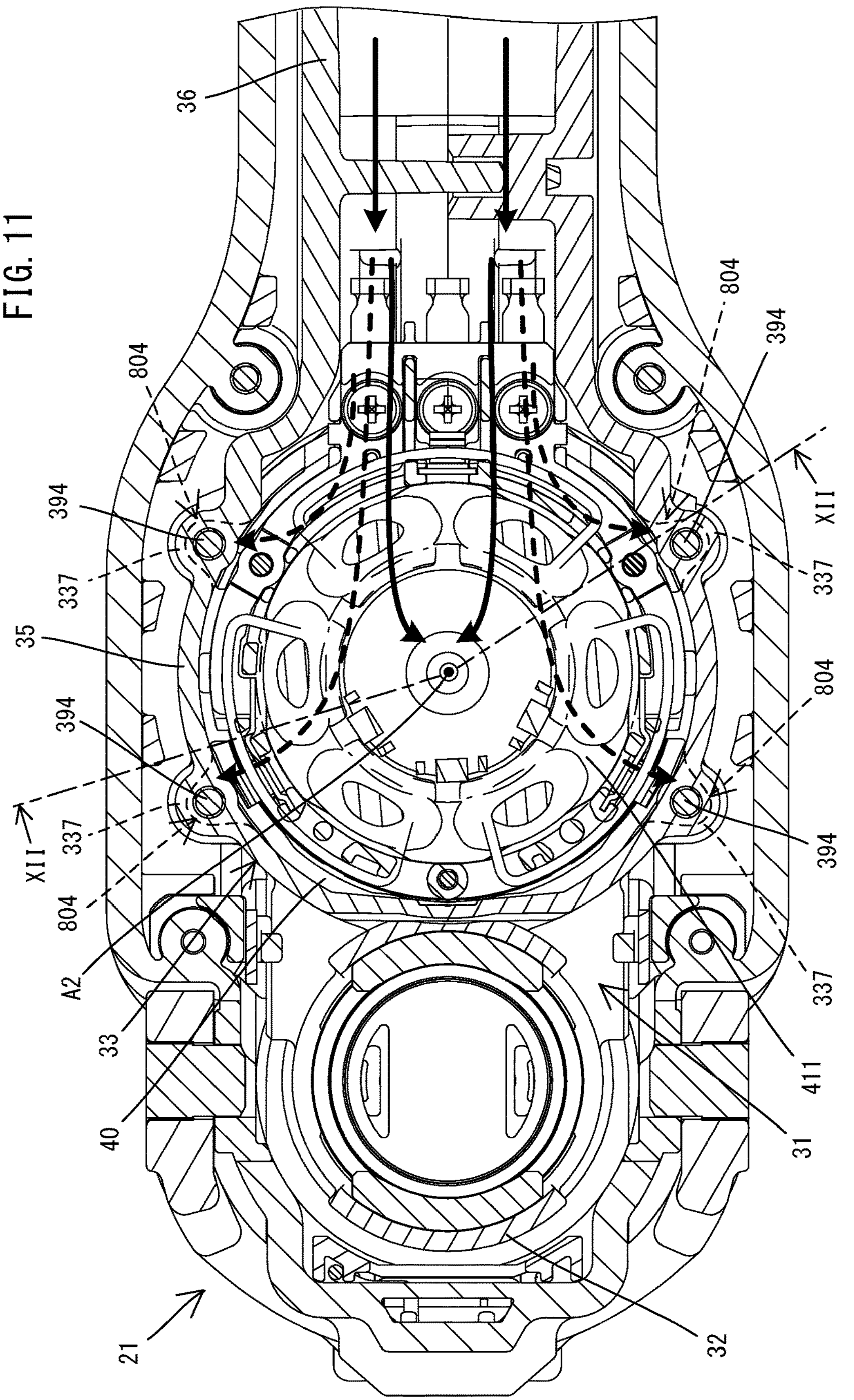
FIG. 11 is a partial, enlarged view of FIG. 2.
Figure 12:
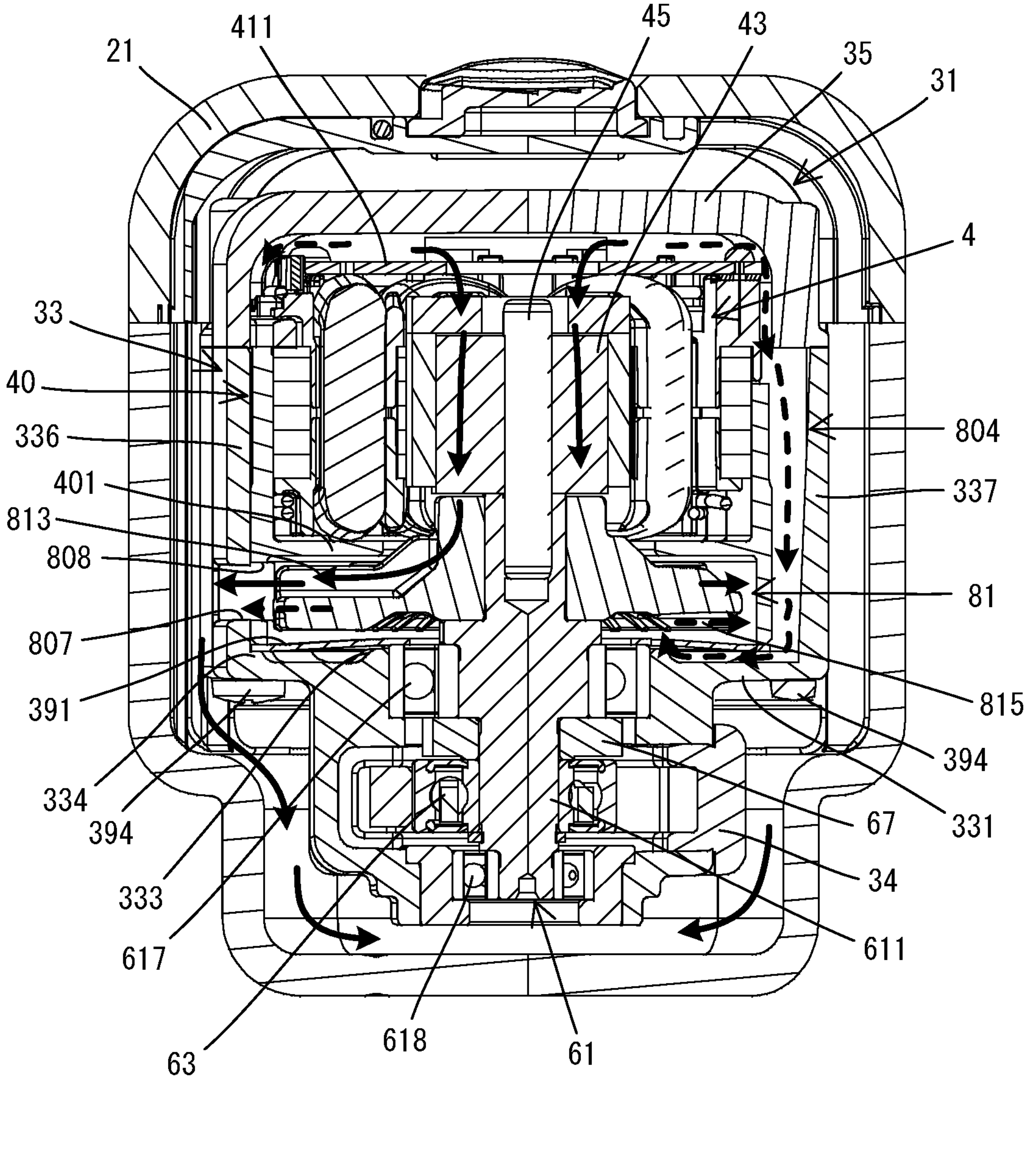
FIG. 12 is a sectional view taken along line XII-XII in FIG. 11.

The motor 4, and the fan 81 that is fixed around the eccentric shaft 61 are housed in a case 40 and arranged in the space above the partition plate 391 in the second housing part 33. The case 40 has a hollow circular cylindrical shape. The case 40 is supported by the stepped portion 334 via the partition plate 391 and fitted in the second housing part 33. Thus, as shown in FIGS. 8, 11 and 12, four passages 804, which extend in the up-down direction, are defined between an outer peripheral surface of the case 40 and inner surfaces of the four protrusions 337 of the peripheral wall 336. Further, a passage 805, which extends in the up-down direction, is defined by the outer peripheral surface of the case 40 and the groove 338 of the peripheral wall 336. As described above, the stepped portion 334 is not formed in the portions that corresponds to the protrusions 332 and 337 and in the portion that corresponds to the groove 338. Therefore, each of the passages 804 and 805 communicates, at its lower end, with the space below the partition wall 391.

The case 40 has an annular partition part 401 below the center of the case 40 in the up-down direction. The partition part 401 protrudes radially inward from the inner peripheral surface of the case 40. The motor 4 is arranged in a space above the partition part 401. An annular board 411, on which Hall sensors are installed, is disposed above the stator 41. The output shaft 45 and the eccentric shaft 61 protrude downward through a through hole of the partition part 401 formed in its center. The first blades 813 and the second blades 815 of the fan 81 are arranged in the space below the partition part 401. Multiple through holes are formed in portions of the case 40 that are located radially outward of the first blades 813 and the second blades 815. These through holes are formed at positions that correspond to the outlets 807 formed through the peripheral wall 336 of the second housing part 33 (see FIG. 12), and thus serve as outlets 808 for discharging air from the inside to the outside of the case 40.

The cover part 35 that covers the open top of the second housing part 33 is connected to the second housing part 33 via four screws 394. Each of the screws 394 fastens the second housing part 33 and the cover part 35 in a state in which a head of the screw 394 is in contact with the lower surface of the bottom wall 331 and a tip end portion of the screw 394 is screwed into the cover part 35. A shank of each of the screws 394 is loosely inserted through the through hole formed in the protrusion 332 and through the passage 804 described above.

In this embodiment, the first blades 813 draw air along (in) a direction of the rotational axis A1 from above, in response to rotation of the fan 81, and feed the air radially outward. Thus, the first blades 813 generates an airflow that enters the housing 10 through the inlet 801, reaches the first blades 813 through the motor 4 and exits the housing 10 through the outlets 809. The paths of this airflow are as follows, and the paths are partially shown by bold arrows in FIGS. 1, 2, 8, 11 and 12.

First, the air drawn into the outer housing 2 through the inlet 801 flows through a gap between the rear part 23 and the rear part 38, as well as into the rear part 38, cools the controller 383, passes between the elastic ribs 371, and then flows into the extending part 36 (see FIGS. 1 and 2). The air passes through the tubular extending part 36 and flows into the front part 21. The air mainly flows into the motor 4 (motor body) through a through hole formed in the center the board 411, from above the board 411 disposed on the top of the stator 41, and flows downward between the stator 41 and the rotor 43 and thereby cools the motor 41. The air then flows into passages formed between the first blades 813 (see FIGS. 8, 11 and 12). The air, which is fed radially outward by the first blades 813, flows out of the inner housing 3 through the outlets 808 of the case 40 and the outlets 807 of the second housing part 33 (see FIG. 12), and then flows out of the housing 10 through the outlets 809 of the outer housing 2 (see FIG. 8).

The second blades 815 draw air along (in) the direction of the rotational axis A1 from below, in response to the rotation of the fan 81, and feeds the air radially outward. Thus, the second blades 815 generates an airflow that enters the housing 10 through the inlet 801, passes a region located radially outward of the motor body and reaches the second blades 815, and then exits the housing 10 through the outlets 809. The paths of this airflow are as follows, and the paths are partially shown by dotted bold arrows in FIGS. 1, 2, 8, 11, and 12 (in which the dotted bold arrows relating to portions that are common with the paths of the airflow generated by the first blades 813 described above are omitted).

First, the air drawn into the outer housing 2 through the inlet 801 flows into the extending part 36 (see FIGS. 1 and 2). The path of the airflow until here is common with the path of the airflow generated by the first blades 813. The air passes through the extending part 36 and flows into the front part 21. The air flows above and around the board 411, and into the passages 804 (a space around the screw 394) and the passage 805, and flows downward (see FIGS. 8, 11 and 12). Then, the air flows into the space below the partition plate 391 through the lower ends of the passages 804 and the passage 805, and flows into passages formed between the second blades 815 through the through holes 392 (see FIGS.

8 and 12). The air cools the fan 81 while flowing through the passages between the second blades 815, flows radially outward of the fan 81, and flows out of the inner housing 3 through the outlets 808 and 807 (see FIG. 12). Then the air flows out of the housing 10 through the outlets 809 of the outer housing 2, similar to the flow of the air fed by the first blades 813 (see FIG. 8).

As described above, in the transmitting mechanism 6 of the oscillating tool 101 of this embodiment, when the motor 4 is driven, the spindle 5 is driven with rotary oscillating motion via the drive bearing 63 fixed around the outer periphery of the eccentric part 611 of the eccentric shaft 61 and the oscillating arm 65 having a bifurcated end portion (i.e., a pair of abutment portions) that abut on the outer periphery of the outer ring 633 of the drive bearing 63. In this transmitting mechanism 6, a large load is applied to the drive bearing 63. As a result, the drive bearing 63 generates heat, and thus the temperature of the drive bearing 63 may become high.

To cope with this, in the oscillating tool 101, the metal fan 81 serving as the heat dissipation part is disposed on the eccentric shaft 61 made of metal, which has relatively high thermal conductivity. Thus, the heat generated in the drive bearing 63 is transferred to the fan 81 via the eccentric shaft 61 owing to the thermal conduction. The fan 81 generates the airflow that enters the housing 10 through the inlet 801, passes the fan 81, and exits the housing 10 through the outlets 809, in response to the rotation of the fan 81. The heat is efficiently exchanged between the air in the airflow and the fan 81, so that the fan 81 is cooled. By cooling the fan 81, the drive bearing 63, which is thermally coupled to the fan 81 via the eccentric shaft 61, is cooled. In this manner, in the oscillating tool 101, the heat generated in the drive bearing 63 is effectively dissipated from the fan 81. Therefore, the plastic retainer 635, which is relatively weak to heat but is superior in resistance to vibration, can be favorably employed in the drive bearing 63.

In particular, in this embodiment, as described above, the housing 10 has the airflow path that directs the air for cooling the motor 4 to the motor 4 (the airflow path from above the motor 4 (through the through hole of the board 411) into the motor 4 (the motor body)), and the airflow paths (the passages 804 and 805), which are formed discretely (separately) from the airflow path described above, that direct the air for cooling the fan 81 to the fan 81 (specifically, the second blades 815). Thus, the fan 81 can be cooled independently of the motor 4. Accordingly, even in a case in which the motor 4 generates a relatively large amount of heat, the heat dissipation performance of the fan 81 can be favorably maintained. In particular, in this embodiment, the paths (specifically, the passages 804, 805) for cooling the fan 81 pass the radially outward region of the motor body (the stator 41) and reaches the fan 81 (specifically, the second blades 815). The stator 43 of the brushless motor is smaller than that of a brushed motor, and thus the heat capacity of the brushless motor is smaller compared to the brushed motor. Therefore, the temperature of the brushless motor is apt to become high. To cope with this, in this embodiment, the motor body is cooled by the airflow that passes between the stator 41 and the rotor 43, while the paths for cooling the fan 81 pass the radially outward region of the motor body (the stator 41 and the rotor 43) (more specifically, outside the case 40). Therefore, it is possible to reduce an influence of the heat of the rotor 43 on the airflow flowing along the paths for cooling the fan 81.

Further, in this embodiment, the fan 81 is a single fan having the first blades 813 configured to generate the airflow for cooling the motor 4, and the second blades 815 configured to generate the airflow for cooling the fan 81. Thus, such a structure achieves efficient cooling of the motor 4 and the fan 81, which is a heat dissipation part, without increasing parts count. The number of the second blades 815, which exchange heat with the air in the airflow for cooling the fan 81, is larger than the number of the first blades 813. Thus, a surface area of the heat dissipation part is increased to thereby enhance the heat dissipation performance. Further, the second blades 815, which are provided in plenty, can increase leading edges that exert a leading edge effect, so that the heat dissipation performance can be enhanced.

Further, in this embodiment, the spindle 5 and the motor 4 are arranged such that the rotational axis A1 and the rotational axis A2 extend in parallel to each other. With such an arrangement, the spindle 5 and the motor 4 can be arranged to be closer to each other (in this embodiment, arranged within the front part 31), compared to a structure in which the rotational axis A1 and the rotational axis A2 intersect each other. This enables downsizing of the oscillating tool 101 (in particular, reduction of the diameter of the grip part).

Second Embodiment

An oscillating tool 102 according to a second embodiment is now described with reference to FIGS. 13 to 15. The most part of the structure of the oscillating tool 102 of the second embodiment is substantially identical to the oscillating tool 101, while a structure of a fan 83 is different. Further, the oscillating tool 102 is different from the oscillating tool 101 in that the oscillating tool 102 includes a heat dissipation plate 85 that is formed discretely from the fan 83. Therefore, in the following description, structures which are substantially identical to those of the first embodiment are given the same numerals and the illustration and the description thereof are omitted or simplified, and different structures are mainly described.

Figure 13:
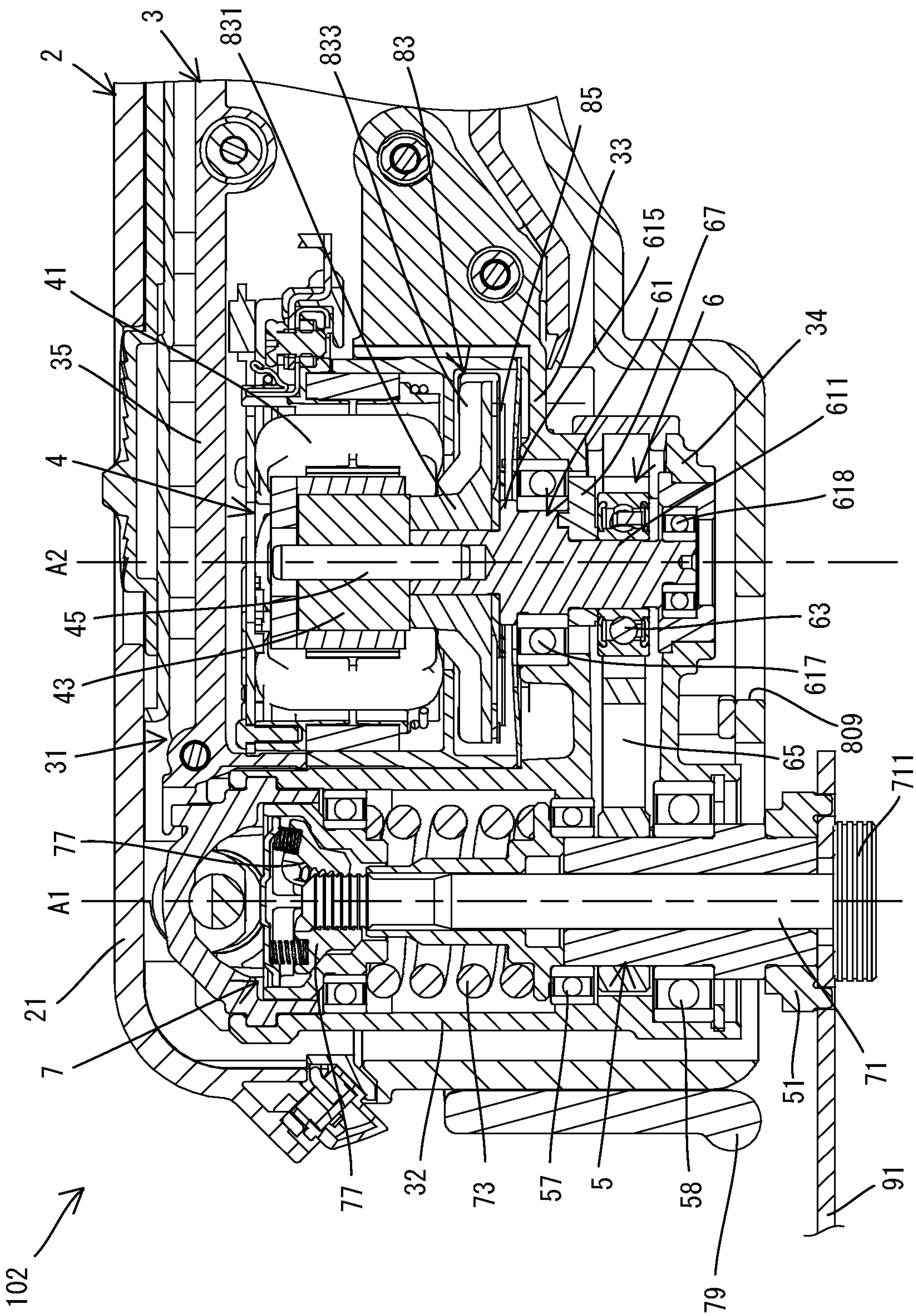
FIG. 13 is a partial, sectional view of an oscillating tool according to another embodiment.

As shown in FIG. 13, also in the oscillating tool 102 of this embodiment, the spindle 5, the lock mechanism 7, the motor 4, and the transmitting mechanism 6 having the same structures as those in the first embodiment are housed in the front part 31 of the inner housing 3. On the other hand, unlike the first embodiment, the fan 83 and the heat dissipation plate 85 are housed together with the motor 4 in the second housing part 33.

The fan 83 of this embodiment is a general centrifugal fan that draws air from one direction. As shown in FIGS. 14 and 15, the fan 83 includes a base 831 and a plurality of blades 833. In this embodiment, the fan 83 is made of plastic (polymer). The base 831 has substantially the same structure as the base 811 (see FIGS. 4 and 7). The base 831 is fixed around the eccentric shaft 61 between the rotor 43 and the bearing 617 in the up-down direction. The blades 833 have substantially the same structure as the first blades 813 (see FIGS. 4 and 7). The blades 833 protrude upward from a plate part of the base 831, and radially extend from the hub to an outer edge of the plate part. The blades 833 draw air along the direction of the rotational axis A1 from above, in response to rotation of the fan 83 and feed the air radially outward. The blades 833 generate an airflow that follows the same path as the airflow generated by the first blades 813, toward the motor 4.

Figure 14:
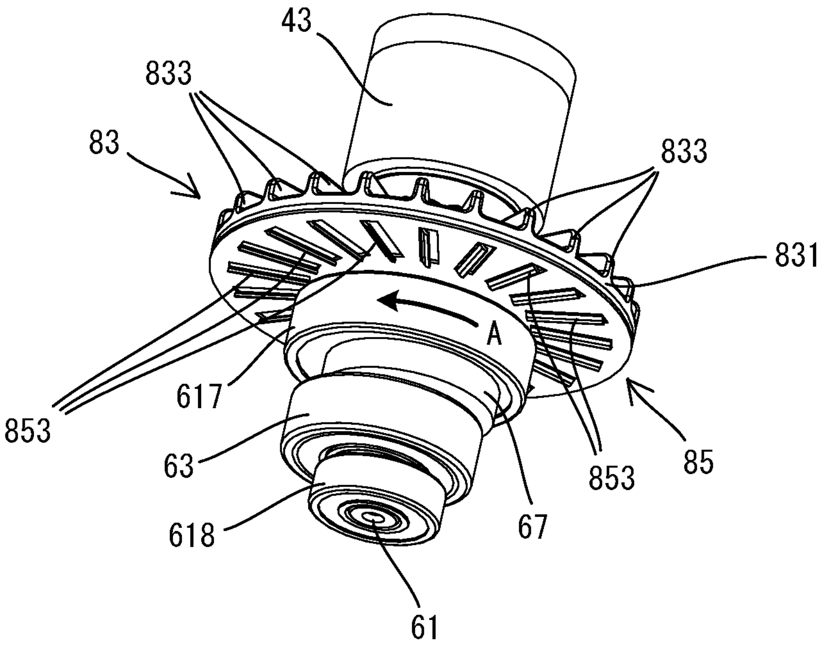
FIG. 14 is a perspective view of a fan, a heat dissipation plate and other components mounted to an eccentric shaft.
Figure 15:
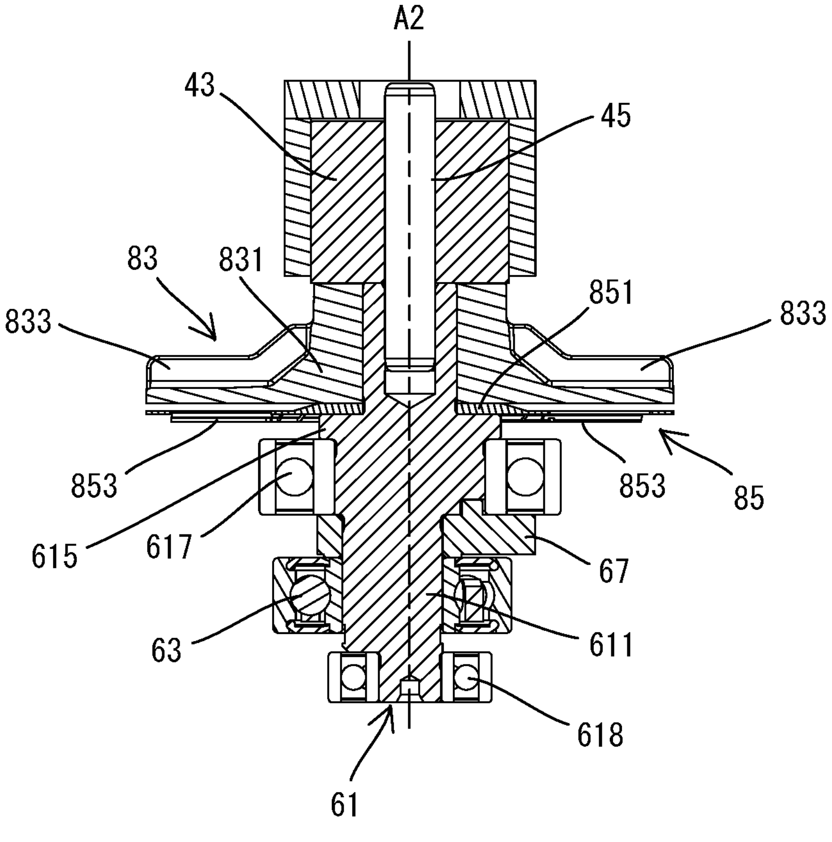
FIG. 15 is a sectional view of the fan, the heat dissipation plate and other components mounted to the eccentric shaft.

As shown in FIGS. 14 and 15, the heat dissipation plate 85 as a whole is an annular flat plate member, and is made of metal (for example, aluminum). The heat dissipation plate 85 is fixed around the eccentric shaft 61 below the fan 83 and protrudes radially outward from the eccentric shaft 61. The heat dissipation plate 85 is fixed such that a central portion 851 of the heat dissipation plate 85 is clamped between a lower surface of the hub of the base 831 and an upper surface of the flange part 615 of the eccentric shaft 61 and the heat dissipation plate 85 is rotatable integrally with the fan 83 and the eccentric shaft 61. The central portion 851 is a thicker portion that protrudes slightly upward relative to a portion of the heat dissipation plate 85 on an outer circumferential side. Thus, a small gap is formed between the fan 83 (the base 831) and the portion on the outer circumferential side of the central portion 851 of the heat dissipation plate 85. In other words, the most part of the upper surface of the heat dissipation plate 85 is not in contact with the fan 83.

A plurality of fins 853, which extend in the radial direction, are formed on the heat dissipation plate 85. In this embodiment, each of the fins 853 is configured as a rectangular protrusion that is formed by cutting and bending a portion of the heat dissipation plate 85. The fin 853 protrudes downward from the lower surface of the heat dissipation plate 85 such that the surface of the fin 853 intersects the circumferential direction around the rotational axis A2 (i.e., a rotation direction of the heat dissipation plate 85). The fin 853 is inclined downward toward a direction generally opposite to the rotation direction (the direction of arrow A in FIG. 14) of the heat dissipation plate 85.

In the oscillating tool 102 configured as described above, when the motor 4 is driven, the fan 83 rotates integrally with the eccentric shaft 61 and generates an airflow that enters the housing 10 through the inlet 801, cools the motor 4, passes the fan 83, and exits the housing 10 through the outlets 809. Also, when the motor 4 is driven, the heat dissipation plate 85 rotates integrally with the eccentric shaft 61. Accordingly, an airflow is generated around the heat dissipation plate 85, and therefore heat exchange between the heat dissipation plate 85 and the air is promoted, so that the heat generated in the drive bearing 63 can be effectively dissipated. In particular, the heat dissipation plate 85 protrudes radially outward from the eccentric shaft 61, and has the fins 853 each having the surface that intersects the rotation direction of the heat dissipation plate 85. The fins 853 increase a surface area of the heat dissipation plate 85 and slice through and stir the air in response to the rotation of the heat dissipation plate 85. Further, leading edges of the fins 853 can exert the leading edge effect. Consequently, also in the oscillating tool 102, the heat generated in the drive bearing 63 is effectively dissipated from the heat dissipation plate 85.

Further, in this embodiment, the heat dissipation plate 85 is a member that is discrete from the fan 83 that generates the airflow for cooling the motor 4. Therefore, a countermeasure against the heat generation of the drive bearing 63 can be realized, while reducing a weight increase of the transmitting mechanism 6, by forming the fan 83 using plastic, which has relatively small specific gravity, and forming the heat dissipation plate 85 using metal, which has relatively large thermal conductivity. Further, the fins 853 are formed by cutting and bending portions of the flat plate-like heat dissipation plate 85, so that a manufacturing cost of the heat dissipation plate 85 can be controlled. In addition, the heat dissipation plate 85 is thermally coupled to the eccentric shaft 61 to be rotatable integrally with the eccentric shaft 61 by a simple method of clamping the heat dissipation plate 85 between the fan 83 and the eccentric shaft 61 to be fixed. This method can facilitate assembling.

Correspondences between the features of the above-described embodiments and the features of the present invention are as follows. Each of the oscillating tools 101, 102 is an example of the "work tool". The housing 10 is an example of the "housing". The spindle 5 is an example of the "spindle". The rotational axis A1 is an example of the "first rotational axis". The motor 4, the stator 41, the rotor 43 and the output shaft 45 are examples of the "motor", the "stator" and the "rotor", respectively. The rotational axis A2 is an example of the "second rotational axis". The transmitting mechanism 6 is an example of the "transmitting mechanism". The eccentric shaft 61 and the eccentric part 611 are examples of the "second shaft" and the "eccentric part", respectively. The drive bearing 63, the inner ring 631, the outer ring 633, the retainer 635 and the ball 637 are examples of the "drive bearing", the "inner ring", the "outer ring", the "retainer" and the "rolling element", respectively. The oscillating arm 65 is an example of the "oscillating member". The fan 81 is an example of the "heat dissipation part" and also of the "fan". The heat dissipation plate 85 is an example of the "heat dissipation part". The fan 83 is an example of the "fan". The first blade 813 and the second blade 815 are examples of the "first blade" and the "second blade", respectively. The inlet 801 is an example of the "inlet". The path extending from above the board 411 to the motor 4 (the motor body) is an example of the "first path". Each of the paths extending through the passages 804 and 805 to the fan 81, the heat dissipation plate 85 is an example of the "second path".

The above-described embodiments are merely exemplary, and a work tool according to the present invention is not limited to the oscillating tools 101 and 102 of the above-described embodiments. For example, the following modifications may be made. Further, one or more of these modifications may be employed in combination with each of the oscillating tools 101 and 102 of the above-described embodiments or with any one of the claimed features.

For example, the fan 81 and the heat dissipation plate 85, each serving as a heat dissipation part, may be formed of metal other than aluminum alloy and aluminum described as examples in the above-described embodiments. For example, zinc, copper, magnesium or alloy containing any one of these metals may be adopted. From a viewpoint of improving the heat dissipation performance, it may be preferable that the fan 81 and the heat dissipation plate 85 are made of metal having relatively high thermal conductivity. Further, from a viewpoint of reducing the weight, it may be preferable to adopt metal having relatively small specific gravity. Similarly, the eccentric shaft 61 that conducts heat from the drive bearing 63 to the fan 81 or to the heat dissipation plate 85 may be made of metal other than iron described as an example. Considering that the eccentric shaft 61 needs the strength more than the fan 81 and the heat dissipation plate 85, in addition to the thermal conductivity, it may be preferable to select appropriate metal for the eccentric shaft 61.

The structure and the arrangement of the fan 81 exemplarily described in the first embodiment may be appropriately changed. Specifically, for example, the diameter of the base 811, the number, the shape, the arrangement etc. of the first blades 813 and the second blades 815 may be changed. The fan 81 is structured as a single member in which the first blades 813 and the second blades 815 are formed integrally with the base 811. However, a first fan having the first blades 813, and a second fan having the second blades 815 may be formed separately from each other and then respectively fixed around the eccentric shaft 61. In this case, similar to the fan 83 and the heat dissipation plate 85 of the second embodiment, the first fan and the second fan may be made of materials different from each other.

The structure and the arrangement of each of the fan 83 and the heat dissipation plate 85 exemplarily described in the second embodiment may be appropriately changed as well. Specifically, for example, the diameter of the base 831, the number, the shape and the arrangement of the blades 833, the diameter of the heat dissipation plate 85, and the number, the shape, the arrangement etc. of the fins 853 may be changed. For example, an outer shape of the heat dissipation plate 85 may be a polygon or a star, instead of a circle. In this case, an outer edge of the heat dissipation plate 85 slices through the air while rotating, so as to exert the leading edge effect. From a viewpoint of improving the heat dissipation performance, it may be preferable to provide the fins 853. However, the fins 853 may be omitted. Further, the fins 853 may be formed by any method other than the method of cutting and bending. Further, contrary to the above-described embodiment, the fins 853 may be inclined in the same direction as the rotation direction of the heat dissipation plate 85. The method of coupling the heat dissipation plate 85 to the eccentric shaft 61 such that the heat dissipation plate 85 rotates integrally with the eccentric shaft 61 is not limited to fixing by clamping described in the above embodiment. For example, the heat dissipation plate 85 may be coupled to the eccentric shaft 61 to be non-rotatable relative to the eccentric shaft 61 by engagement between a recess (recesses) formed in one of the heat dissipation plate 85 and the flange part 615 and a protrusion (protrusions) formed on the other one of the heat dissipation plate 85 and the flange part 615. Further, depending on the structure of the fins 853, the flange part 615 of the eccentric shaft 61 that is held in contact with the central portion 851 of the heat dissipation plate 85 may be enlarged radially outward as long as the flange part 615 does not contact the outer ring of the bearing 617, so that the heat dissipation performance is improved.

Further, in the above-described embodiments, the fans 81 and 83 each configured as a centrifugal fan are exemplarily described. However, instead of the centrifugal fan, an axial fan or a mixed flow fan may be adopted. In accordance with the change of the fans 81, 83, the airflow paths in the housing 10 may be appropriately changed. For example, the motor 4 and the heat dissipation part (for example, the heat dissipation plate 85) may be arranged on a downstream side in a flow direction of the airflow generated by the axial fan. Further, the airflow paths may be branched on the downstream side of the axial fan into a path for cooling the motor 4 and another path for cooling the heat dissipation part.

In the above-described embodiments, the spindle 5 and the motor 4 are arranged in the front part of the housing 10 such that the rotational axes A1 and A2 extend in parallel to each other. However, the spindle 5 and the motor 4 may be arranged such that the rotational axes A1 and A2 are orthogonal to each other. In this case, the motor 4 may be arranged in the grip part of the housing 10. Further, a so-called barrel-shaped bearing, of which the outer ring 633 has a curved outer peripheral surface, is adopted as the drive bearing 63.

Further, the structures of the housing 10, the spindle 5, the motor 4, the transmitting mechanism 5 and the lock mechanism 7 are not limited to those of the above-described embodiments, but may be appropriately changed. For example, the shape of each of the outer housing 2 and the inner housing 3, and the elastic connection structure therebetween may be appropriately changed. Further, the housing 10 may be a housing having a single layer, instead of the vibration-isolating housing. The motor 4 may be an outer-rotor type brushless motor, instead of an inner-rotor type brushless motor. The motor 4 may be a brushed motor, instead of the brushless motor. Further, an AC motor may be adopted, instead of the DC motor. The one of the two end portions of the oscillating arm 65 that is configured to abut on the outer ring 633 of the drive bearing 63 may be formed in, for example, an annular shape instead of a bifurcated shape, as long as this end portion has a pair of abutment parts that abut on the outer ring 633 at left and right two positions on the outer ring 633. The lock mechanism 7 may be configured to fixedly hold the clamping shaft 71 relative to the spindle 5 using a ball(s) or other member(s), instead of the clamping members 77. Alternatively, the lock mechanism 7 may be omitted. In accordance with the change of the lock mechanism 7, the structure of the spindle 5 may be changed. In a case in which the lock member 7 is omitted, the clamping shaft 71 may be fixed relative to the spindle 5 using a screw or the like.

Further, in view of the nature of the present invention, the above-described embodiments and the modifications thereof, the following Aspects can be provided. Any one of the following Aspects can be employed alone or in combination with any one of the oscillating tools 101, 102 of the above-described embodiments, the above-described modifications and the claimed features.

(Aspect 1)

The heat dissipation part is arranged between the rotor and the drive bearing in an axial direction of the second rotational axis.

(Aspect 2)

The work tool further comprises a pair of bearings that rotatably support the second shaft, the eccentric part is arranged between the pair of bearings, and the heat dissipation part is arranged between one of the pair of bearings that is closer to the rotor and the rotor in an axial direction of the second rotational axis.

(Aspect 3)

The fan is fixed to the second shaft and configured to rotate around the second rotational axis.

(Aspect 4)

The fan is configured to generate an airflow for cooling the motor.

(Aspect 5)

The fan is configured as a centrifugal fan that is capable of drawing air from two directions.

(Aspect 6)

The first path is configured to direct the airflow for cooling the motor between the stator and the rotor.

(Aspect 7)

The work tool further comprises a case that houses the motor body, and the second path passes an outside of the case in the radial direction (Aspect 8)

The second end portion of the oscillating member includes a pair of abutment parts that face each other in a direction orthogonal to the second rotational axis and that abut on the outer periphery of the outer ring.

DESCRIPTION OF THE REFERENCE NUMERAL

101, 102: oscillating tool, 10: housing, 2: outer housing, 21: front part, 22: central part, 23: rear part, 29: switch, 296: operation part, 3: inner housing, 31: front part, 32: first housing part, 33: second housing part, 331: bottom wall,

332: protrusion, 333: cylindrical portion, 334: stepped portion, 336: peripheral wall, 337: protrusion, 338: groove, 34: third housing part, 35: cover part, 36: extending part, 37: elastic connection part, 371: elastic rib, 38: rear part, 383: controller, 391: partition plate, 392: through hole, 394: screw, 4: motor, 40: case, 401: partition part, 41: stator, 411: board, 43: rotor, 45: output shaft, 5: spindle, 51: tool mounting part, 57: bearing, 58: bearing, 6: transmitting mechanism, 61: eccentric shaft, 611: eccentric part, 615: flange part, 617: bearing, 618: bearing, 63: drive bearing, 631: inner ring, 633: outer ring, 635: retainer, 637: ball, 65: oscillating arm, 67: balancer, 7: lock mechanism, 71: clamping shaft, 711: clamping head, 73: biasing spring, 77: clamping member, 79: lever, 801: inlet, 804: passage, 805: passage, 807: outlet, 808: outlet, 809: outlet, 81: fan, 811: base, 813: first blade, 815: second blade, 83: fan, 831: base, 833: blade, 85: heat dissipation plate, 851: central portion, 853: fin, 91: tool accessory, 93: battery, A1: rotational axis, A2: rotational axis

The invention claimed is:

1. A work tool configured to drive a tool accessory in an oscillating manner to perform a processing operation on a workpiece, the work tool comprising:

a housing;

a spindle supported by the housing to be rotatable around a first rotational axis;

a motor housed in the housing and including a stator, a rotor, and a first shaft, the first shaft extending from the rotor and being configured to rotate integrally with the rotor around a second rotational axis;

a transmitting mechanism configured to transmit rotation of the first shaft to the spindle to cause the spindle to rotary oscillate around the first rotational axis; and a heat dissipation part, wherein:

the transmitting mechanism comprises:

a second shaft made of metal and coaxially coupled to the first shaft and having an eccentric part that is eccentric to the second rotational axis;

a drive bearing including an inner ring fixed around the eccentric part, an outer ring, a retainer made of plastic and between the inner ring and the outer ring, and a plurality of rolling elements rollably retained by the retainer; and an oscillating member having a first end portion fixed to the spindle and a second end portion abutting on an outer periphery of the outer ring of the drive bearing;

the heat dissipation part is made of metal, in contact with the second shaft and configured to rotate integrally with the second shaft; and the housing has a first path that directs an airflow for cooling the motor to the motor and a second path that (i) is different from the first path and (ii) directs an airflow to the heat dissipation part for cooling the heat dissipation part.

2. The work tool as defined in claim 1, wherein the heat dissipation part protrudes radially outward from the second shaft and has an intersecting surface that intersects a rotation direction of the heat dissipation part.

3. The work tool as defined in claim 1, wherein the heat dissipation part is a fan that is configured to be rotated by power of the motor to generate an airflow that flows into the housing through an inlet of the housing.

4. The work tool as defined in claim 1, further comprising:

a fan configured to be rotated integrally with the second shaft by power of the motor to generate an airflow that flows into the housing through an inlet of the housing, wherein the heat dissipation part is a discrete member from the fan.

5. The work tool as defined in claim 4, wherein the heat dissipation part is between the fan and the drive bearing in an axial direction of the second rotational axis.

6. The work tool as defined in claim 1, wherein the fan is a single fan having a plurality of first blades configured to generate the airflow that flows along the first path, and a plurality of second blades configured to generate the airflow that flows along the second path.

7. The work tool as defined in claim 6, wherein the number of the plurality of second blades is larger than the number of the plurality of first blades.

8. The work tool as defined in claim 1, wherein:

the motor is a brushless motor, and the second path passes a radially outward region of a motor body that includes the stator and the rotor.

9. The work tool as defined in claim 1, wherein the first rotational axis and the second rotational axis are parallel to each other.

10. The work tool as defined in claim 3, wherein the fan is a single fan having a plurality of first blades configured to generate the airflow that flows along the first path, and a plurality of second blades configured to generate the airflow that flows along the second path.

11. The work tool as defined in claim 10, wherein the fan is a centrifugal fan configured to draw air from two directions.

12. The work tool as defined in claim 11, wherein the number of the plurality of second blades is larger than the number of the plurality of first blades.

13. The work tool as defined in claim 12, wherein:

the motor is a brushless motor, and the second path passes a radially outward region of a motor body that includes the stator and the rotor.

* * * * *